(12) United States Patent
Binder et al.

(10) Patent No.: US 7,682,125 B2
(45) Date of Patent: Mar. 23, 2010

(54) DEVICE FOR RECEIVING AND FOR TRANSPORTING AN ARTICLE

(75) Inventors: Jan Binder, Esslingen (DE); Steffen Mayer, Rutesheim (DE)

(73) Assignee: MULTIVAC Sepp Haggenmueller GmbH & Co. KG, Wolfertschwenden (DE)

( * ) Notice: Subject to any disclaimer, the term of this patent is extended or adjusted under 35 U.S.C. 154(b) by 0 days.

(21) Appl. No.: 12/232,273

(22) Filed: Sep. 12, 2008

(65) Prior Publication Data

US 2009/0104010 A1   Apr. 23, 2009

(30) Foreign Application Priority Data

Sep. 13, 2007   (DE) ...................... 10 2007 045 042
Nov. 27, 2007   (DE) ...................... 10 2007 058 265
May 9, 2008     (DE) ...................... 10 2008 023 770

(51) Int. Cl.
*B65G 47/90*   (2006.01)
(52) U.S. Cl. .................................. 414/797.2
(58) Field of Classification Search ............. 414/797.2; 271/268; 198/416, 596
See application file for complete search history.

(56) References Cited

U.S. PATENT DOCUMENTS

| 1,464,513 | A |   | 8/1923  | Sutherland, Jr. |
| 3,143,222 | A | * | 8/1964  | Caskie ..................... 414/792.2 |
| 3,263,829 | A | * | 8/1966  | Derricott et al. .......... 414/796.7 |
| 4,280,618 | A | * | 7/1981  | Jensen ......................... 198/782 |
| 5,352,085 | A | * | 10/1994 | Sargent et al. .............. 414/796 |
| 5,524,747 | A | * | 6/1996  | Wohlfahrt et al. ........... 198/512 |
| 5,538,391 | A | * | 7/1996  | Bonnet ..................... 414/796.5 |

FOREIGN PATENT DOCUMENTS

| DE | 30 24 192 A1    | 3/1981 |
| EP | 0 594 476 A     | 4/1994 |
| WO | WO 2007/093774 A | 8/2007 |

* cited by examiner

*Primary Examiner*—Douglas A Hess
(74) *Attorney, Agent, or Firm*—Breneman & Georges

(57) ABSTRACT

Device for receiving and for transporting an article, which device has receiving means which can be slid under the article by a sliding unit, characterized in that the receiving means are formed by rollers (10) which are arranged transversely to the direction in which they are slid under the article (1) by the sliding unit (20) and are driven in such a way that their circumferential velocity is equal in amount, but opposite in direction, to the speed at which they are slid under the article (1).

19 Claims, 7 Drawing Sheets

DEVICE FOR RECEIVING AND FOR TRANSPORTING AN ARTICLE

CROSS-REFERENCE TO RELATED APPLICATIONS

The subject matter of this application is related to the subject matter of U.S. application Ser. No. 12/232,273 titled, "Device For Receiving And For Transporting An Article" filed Sep. 12, 2008 and U.S. application Ser. No. 12/232,272 titled, "Device For Receiving And For Transporting An Article" filed Sep. 12, 2008.

BACKGROUND OF THE INVENTION (1) Field of the Invention

The invention relates to a device for receiving and for transporting an article, which device has receiving means which can be slid under the article by a sliding means. Once the receiving means have picked up the article from an underlay, for example a conveyor belt, they are moved by a robot to a different location where they release the article again, for example into a packing tray.

(2) Description of Related Art Including Information Disclosed Under 37 C.F.R. 1.97 and 1.98

Devices of this type are known for example from WO 99/0036, JP 57-151533 and WO 2005/051812. The transportation of articles of this type presents particular problems when said articles are so flexible that they are compressed when they are received by the receiving means. Special measures must then be taken to avoid this.

GB 2 378 432 A discloses an arrangement in which gripping fingers are placed from both sides on a cake in order to hold said cake with a certain pressure. In order to be able to raise the cake, the gripping fingers are configured so as to have a plate via which a belt is drawn. The belt is in contact with the cake. If it is drawn upward via the plate, it takes the cake up with it.

A similar arrangement, in which however the plate is moved not vertically but rather horizontally, is described in WO 2007/093774 A1. In this case, during each movement cycle, a spring holding the belt at one end has to be tensioned over the entire path of movement of the belt. Furthermore, during its movement over the plate, the belt is subject to wear owing to the friction on the plate.

A further device of the above-mentioned type is described in the Applicant's own earlier German application 10 2007 045 042.

BRIEF SUMMARY OF THE INVENTION

The object of the present invention is to provide, avoiding these drawbacks, a device of the type mentioned at the outset in which the article is received in a simpler and more reliable manner.

According to the invention, this object is achieved in that the receiving means are formed by rollers which are arranged transversely to the direction in which they are slid under the article by the sliding means and are driven in such a way that their circumferential velocity in the region (12) in which the article (1) is received is equal, but opposite in direction, to the speed at which the sliding means is slid under the article.

Advantageous developments of the invention are achieved by having a driven front roller driven in a rotational direction equal to but opposite to the speed in which the sliding means is slid under the article with additional non driven freely rotatable rollers, by having the rollers mounted on a sliding unit which is displaceable relative to a stationary frame structure, by having the rollers driven by friction transmittal from a component of the stationary frame structure, by having a friction lining pressed against the rollers, by having the rollers driven by a toothed or geared rack structure disposed on the stationary frame structure and by having a second sliding unit disposed on the frame structure connected by a pneumatic piston-cylinder arrangement so that each sliding unit can synchronously move toward and away from each other.

When the rollers are slid under the article, they therefore lift the article somewhat, although no relative movement, which might generate frictional forces which could compress the article, occurs between the article and rollers in the sliding direction.

Arrangements of this type can be used not only, as mentioned hereinbefore, in the food industry but rather also in the transportation of electronic components in which, despite being rigid, any type of relative movement between grippers and the surface must be avoided in order not to scratch the surfaces. Examples include semiconductor wafers.

BRIEF DESCRIPTION OF THE SEVERAL VIEWS OF THE DRAWING(S)

Exemplary embodiments of the invention and advantageous developments thereof will be described hereinafter with reference to the appended drawings in which:

FIG. 3a is a section in the direction of the arrows IIIa-IIIa in FIG. 3;

DETAILED DESCRIPTION OF THE INVENTION INCLUDING BEST MODE

Figure 1:
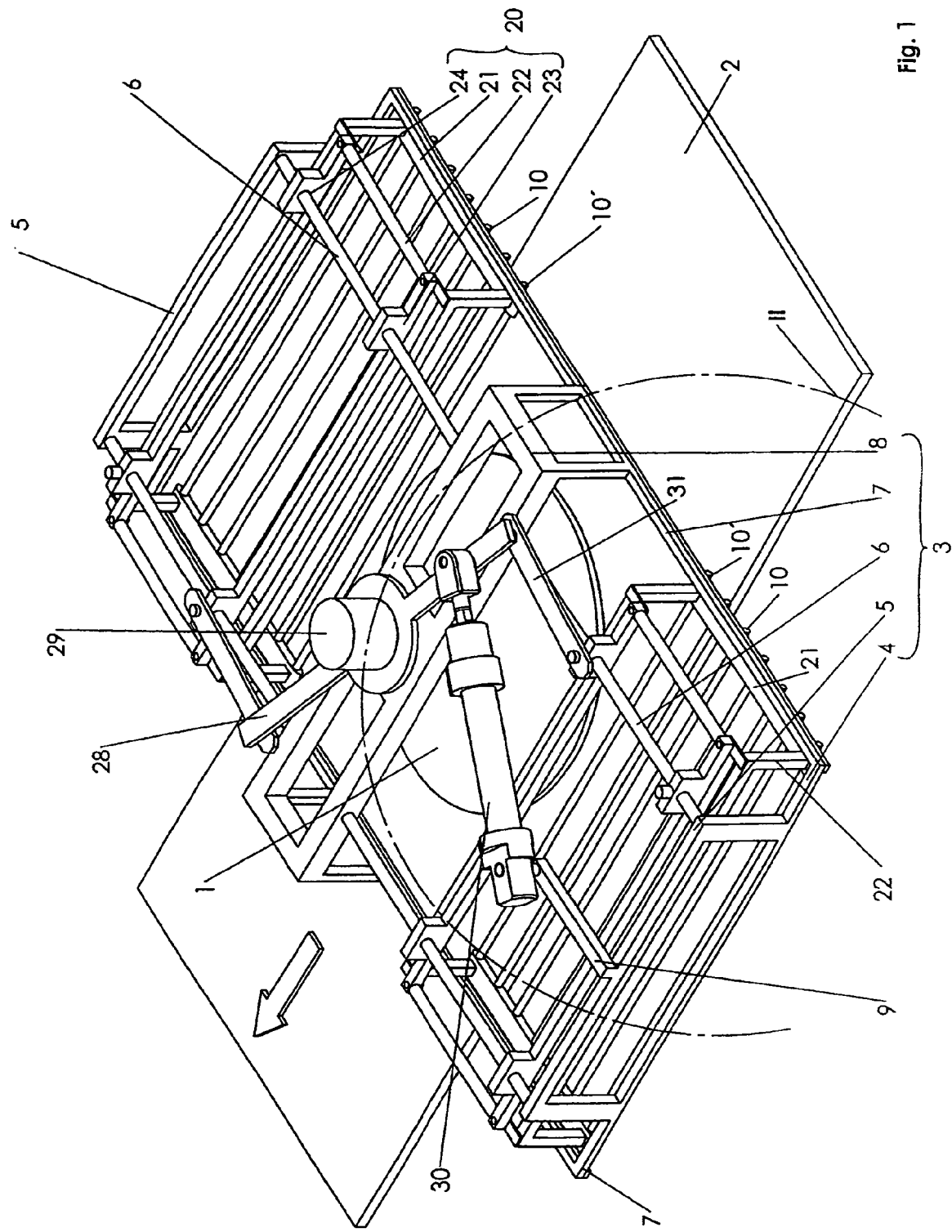
FIG. 1 shows a first exemplary embodiment.
Figure 2:
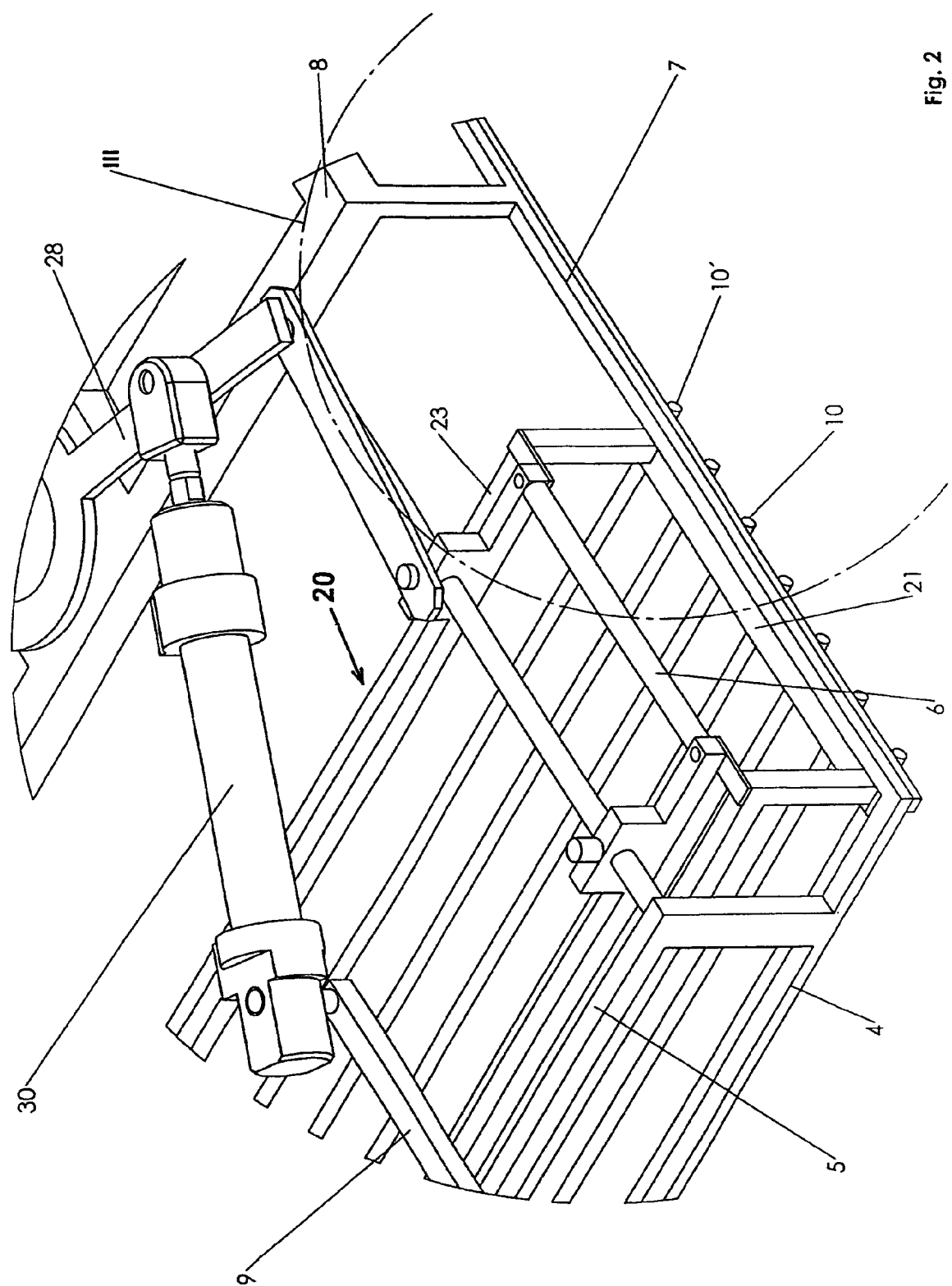
FIG. 2 is an enlarged view of the region II in FIG. 1.
Figure 3:
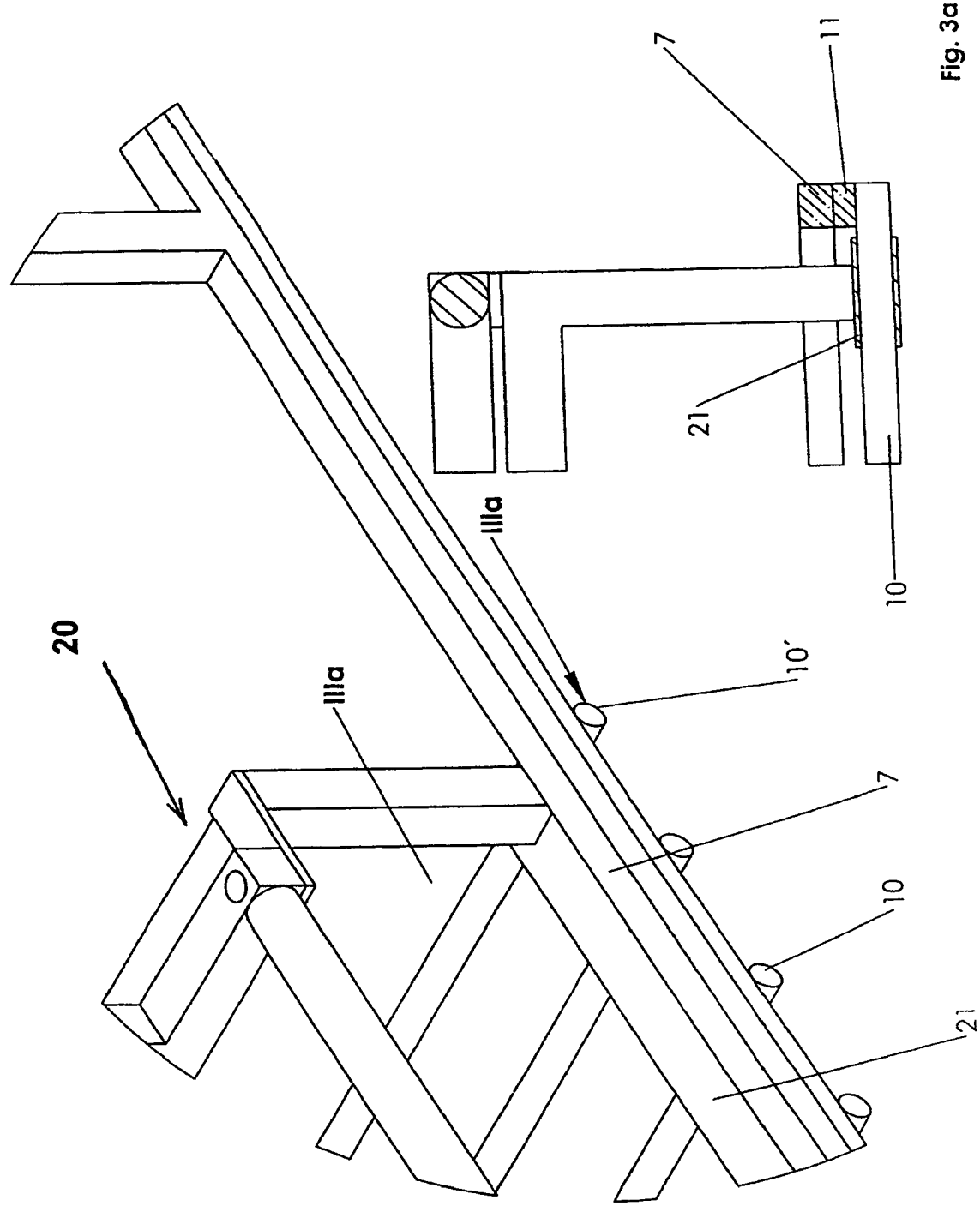
FIG. 3 is an enlarged view of the region III in FIG. 2.

FIGS. 1-3 and 6 show an article 1, for example a slice of sausage, cheese or meat lying on a surface, namely a conveyor belt 2. The conveyor belt 2 has moved the article 1 into this position in the direction of the indicated arrow.

The device has on both sides of the conveyor belt 2 a respective stationary frame structure 3 which (despite being provided for the sake of simplicity with reference numerals only on one side of the belt) is formed by struts 4, U-shaped brackets 5 connected thereto, guide rods 6 arranged on the bracket, and also by two further struts 7, said further struts joining the two frame structures 3 together. Arranged centrally on the two struts 7 is a further box-type frame 8 which carries the bearing 29 of a sliding means which can be moved back and forth by the two sliding units 20 which are arranged on both sides of the conveyor belt 2, and thus of the article 1, but of which for the sake of simplicity only one is provided with reference numerals (cf. the arrows indicated at the bottom left in FIG. 4). These sliding units 20 are formed by struts 21, U-shaped brackets 22 and crossbars 23. The crossbars are provided with guide openings 24 through which the guide rods 6 of the frame structure 3 are guided. This allows the sliding units 20 to be moved back and forth on the guide rods 6.

The back and forth movement is carried out by a pivot lever 28 which is mounted on the bearing 29 on the box-type frame 8 and on which there acts the piston rod of a pneumatically driven piston/cylinder arrangement 30 which is rotatably mounted on a boom 9 and thus supported on the frame structure 3. The boom 9 is connected to the U-shaped bracket 5 of the frame structure 3. The movement of the pivot lever 28 is transmitted by a toggle lever 31 to the crossbars 23 and thus to the sliding units 20.

As may be seen from FIG. 3a, rollers 10 are rotatably mounted in the struts 21 which are part of the sliding units 20. The struts 21 therefore form the bearings, which are arranged on the sliding units 20, for the rollers 10. One of the struts 7, which are, as mentioned, part of the stationary frame structure 3, presses in each case with a certain contact pressure onto the free, outwardly protruding ends of the rollers 10. The struts 7 are provided on their underside with a friction lining 11. If the sliding unit 20, and with it the struts 21, is now moved by pneumatic actuation of the piston/cylinder unit 30, the rollers 10 are then rotated by displacement of the struts 7 and the friction lining 11, in such a way that the speed of the sliding unit 20 is equal to the circumferential velocity of the rollers 10 driven thereby. The rollers 10 can also be driven—instead of by the friction lining U—by toothed racks which are connected to the struts 7.

Figure 4:
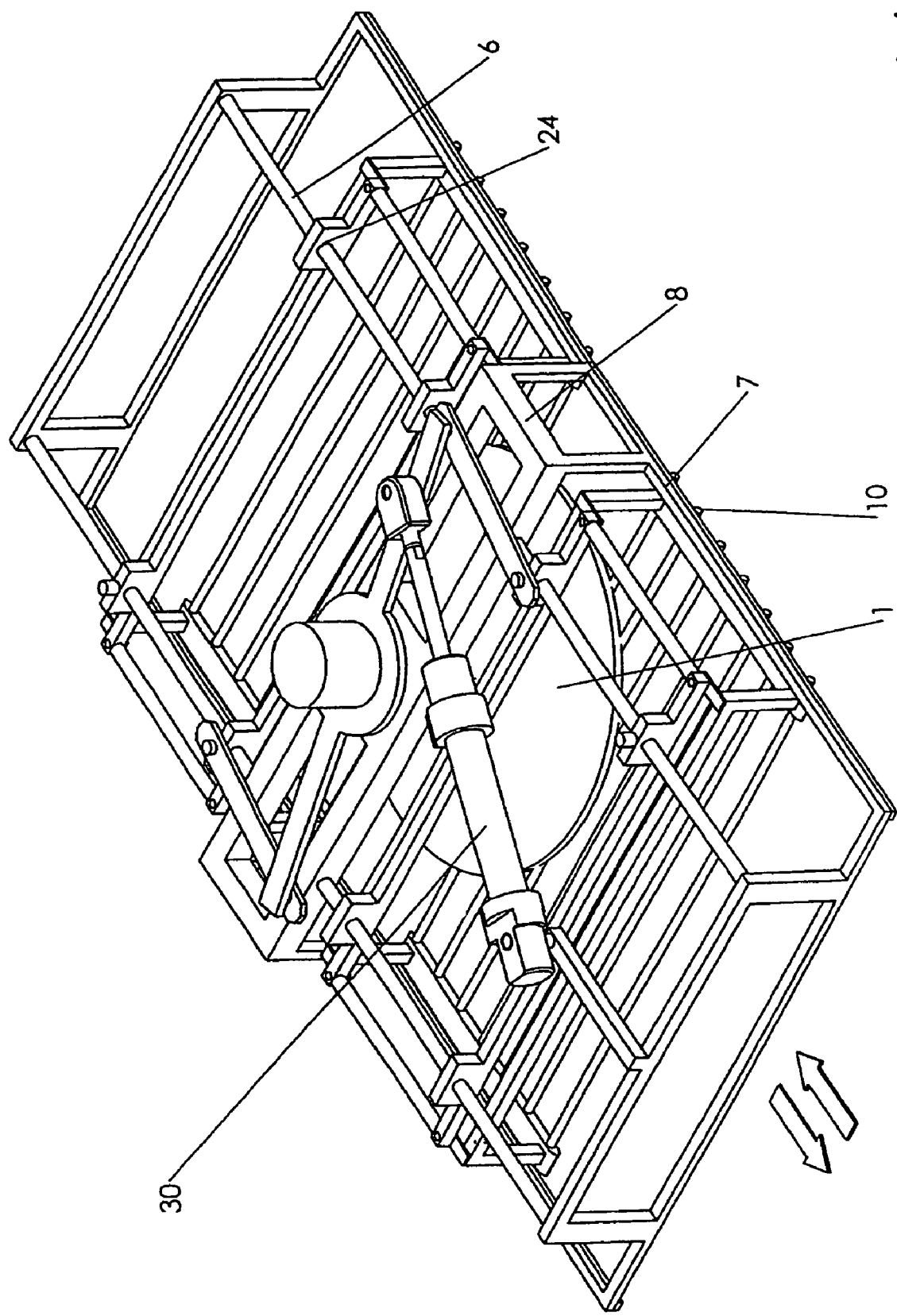
FIG. 4 is a schematic view of the arrangement according to FIG. 1 in which rollers 10 have already reached under the article 1.
Figure 5:
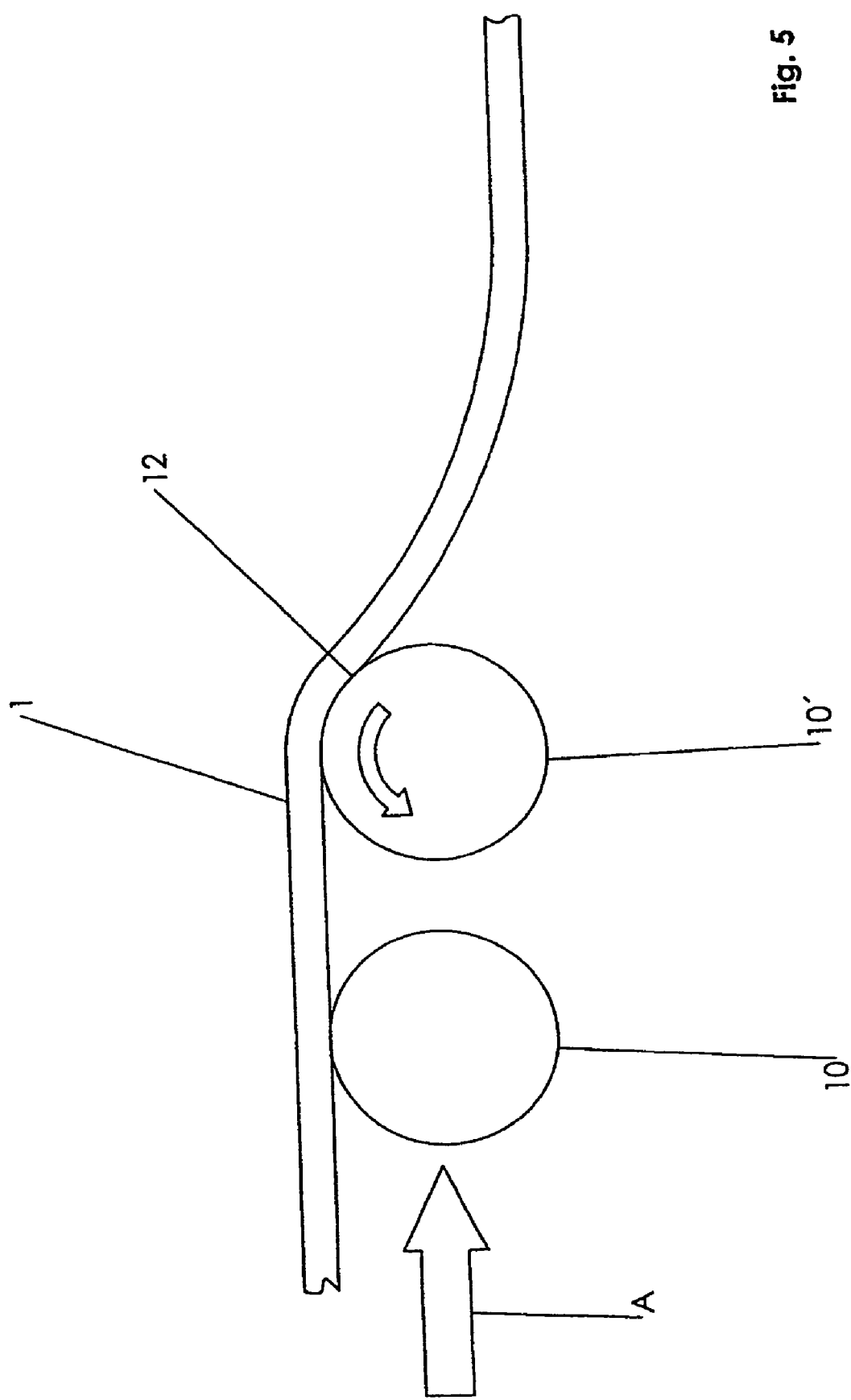
FIG. 5 is a schematic view of the movement conditions in the region in which the rollers 10 are in contact with the article 1.
Figure 6:
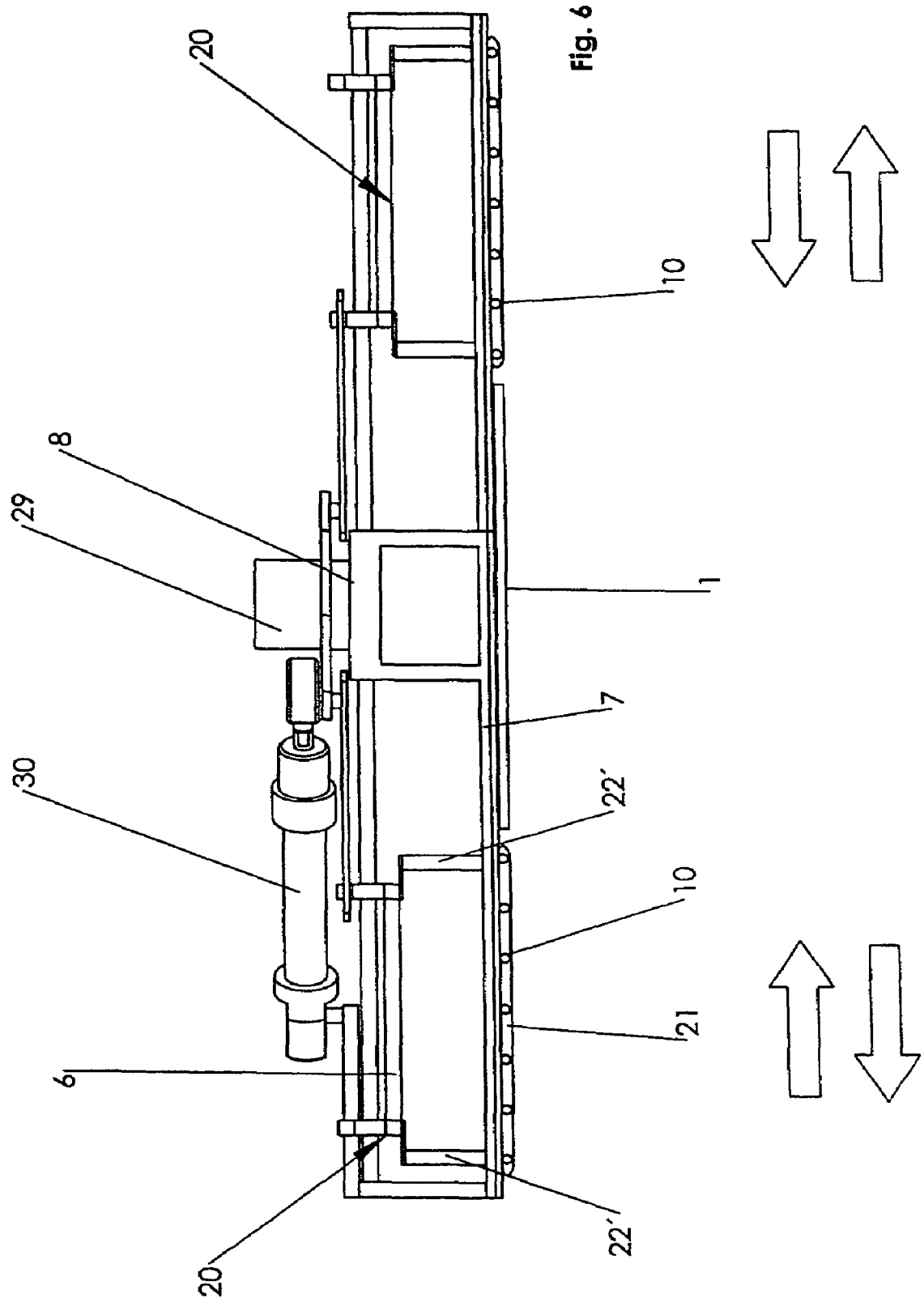
FIG. 6 is a side view of the arrangement according to FIG. 1.

If now, as may be seen from FIG. 4, the rollers 10 are moved toward one another by actuating the piston/cylinder means 30, the rollers 10 slide under the article 1 in direction A in the manner such as may be seen from FIG. 5. The rollers 10 are rotated in the anticlockwise direction by the relative movement of the struts 7, thus ensuring that in the region 12 of contact between the rollers 10 and the strut 7 the rollers 10 rotate along their circumference at the same circumferential velocity at which the rollers are slid under the article 1 in the direction of the indicated arrow A, so that there takes place merely lifting but no relative movement, caused by a force, of the circumferential surface of the rotating roller 10 relative to the article 1 in the sliding direction. A flexible product, such as for example a slice of sausage, cheese or meat, is therefore not compressed or folded. The article must merely have sufficient stability that it does not fall into the gap between two successively arranged rollers 10.

Figure 7:
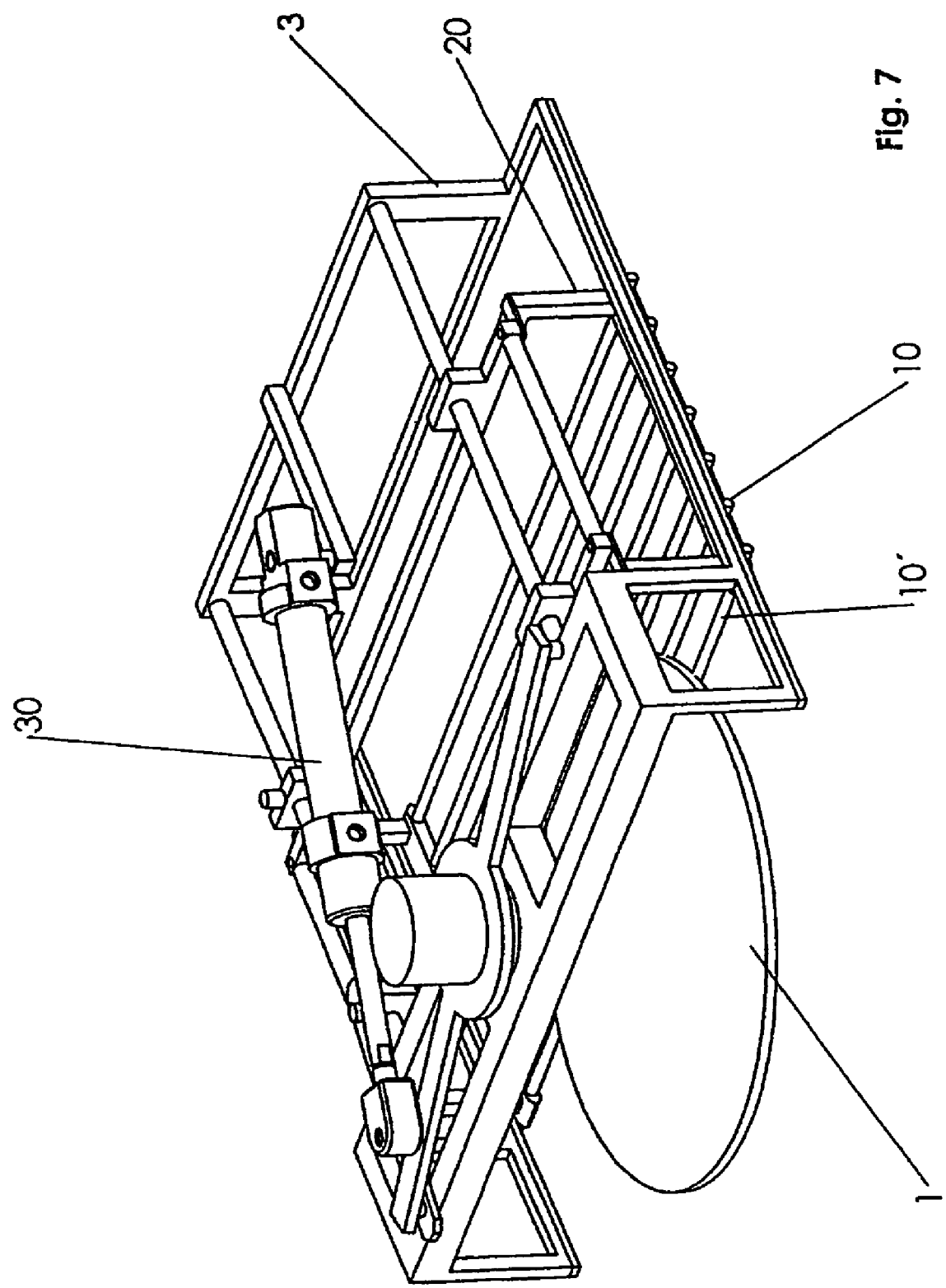
FIG. 7 shows a second exemplary embodiment.

FIG. 7 shows an exemplary embodiment with merely one stationary frame structure 3 and merely one sliding unit 20 which act on an article 1 from merely one side. Otherwise, the components correspond to those according to FIGS. 1-6.

The device as a whole can be fastened on the bearing 29, which is in the form of a journal or a hub, to a robot and transported to a different location.

What is claimed is:

1. In a device for receiving and for transporting an article having a receiving means which can be slid under the article and a sliding unit wherein the improvement comprises a receiving means having a plurality of rollers (10) arranged transversely to the direction in which they are slid under the article (1) by the sliding unit (20) driven in such a way that a rotational speed of a first roller in said plurality of rollers is equal, but opposite in direction, to the reciprocal speed at which the sliding unit is slid under the article (1) and a pivotal lever and bearing to drive and coordinate the speed of the receiving means and the sliding unit.

2. The device according to claim 1, wherein the front roller (10') is driven at said rotational speed equal but opposite to the reciprocal speed of the sliding unit (20) and a remaining plurality of rollers are non-driven rollers and are freely rotatable.

3. The device according to claims 1 or 2, further comprising a stationary frame structure (3) wherein the sliding unit (20) is displaceable relative to said stationary frame structure.

4. The device according to claim 3 wherein said plurality of rollers (10) are driven by friction transmitted from a strut (7) on a stationary frame structure (3).

5. The device according to claim 4 wherein said strut (7) has a friction lining (11) pressed against the plurality of rollers (10).

6. The device according to claim 1 wherein the plurality of rollers (10) are driven by a stationary toothed rack on a stationary frame structure (3).

7. The device according to claim 1 further comprising a second sliding unit (20) disposed across from said first sliding unit and both sliding units can be moved toward each other and away from each other by a pneumatic piston/cylinder arrangement (30) connected to said pivotal lever and bearing.

8. An apparatus for conveying flexible articles or articles covered by a flexible wrapping comprising:
 (a) a stationary frame;
 (b) a reciprocal sliding means having a receiving means with a control means for sliding under an article disposed on said stationary frame;
 (c) a receiving means having rollers arranged transversely to the direction of travel of said sliding means;
 (d) a control means for controlling the speed of at least one roller on said receiving means;
 (e) a single drive lever for driving said receiving means, said reciprocal sliding means and operating said control means to control the rotational speed of said at least one roller at a rotational speed at which equal to but opposite in direction to the reciprocal speed the reciprocal sliding means is slid under the article.

9. The apparatus of claim 8 wherein said rollers of said receiving means partially lift the article.

10. The apparatus of claim 8 wherein said control means is a friction lining or a toothed or a geared rack.

11. The apparatus of claim 8 comprising a second reciprocal sliding means and a second receiving means disposed on said stationary frame.

12. The apparatus of claim 11 wherein said second reciprocal sliding means and said second receiving means are connected to said single drive lever.

13. The apparatus of claim 12 wherein said single drive lever is connected to a piston-cylinder combination.

14. A device for conveying flexible articles or packages comprising:
 (a) a slidable assembly mounted on a fixed frame;
 (b) a receiving means having rollers disposed substantially perpendicular to said slidable assembly;
 (c) a friction lining or a geared rack for coordinating a rotational speed of said rollers on said receiving means with a reciprocal speed equal to that of said slidable assembly;
 (d) a combination mechanical links and levers connecting said slidable assembly to said receiving means and said rollers; and
 (e) a single drive means connected to said combination of mechanical links and levers to coordinate movement and speed of said slidable assembly with the rotational speed of said rollers on said receiving means.

15. The device of claim 14 wherein said friction lining ensures said rollers are rotated in a counterclockwise direction at the same relative circumferential velocity as the transverse velocity of said slidable assembly.

16. The device of claim 15 wherein said single drive means is a piston cylinder combination connected to said mechanical combination of links and levers.

17. The device of claim 14 further comprising a second slidable assembly and a second receiving means.

18. The device of claim 17 wherein said second slidable assembly and said second receiving means is connected to said combination of links and levers.

19. The device of claim 18 further comprising a piston cylinder combination disposed between said single drive means and said combination of mechanical links and levers.

* * * * *